United States Patent
Ungerer et al.

(10) Patent No.: US 10,158,733 B2
(45) Date of Patent: Dec. 18, 2018

(54) AUTOMATED DPI PROCESS

(71) Applicant: App Annie Inc., San Francisco, CA (US)

(72) Inventors: Mark Wilson Ungerer, San Francisco, CA (US); Yu Chen, Beijing (CN); Jia Wang, Beijing (CN); Bo Lin, Beijing (CN); Lylian Abel Antoine Kieffer, Beijing (CN); Agha Zain, San Jose, CA (US)

(73) Assignee: App Annie Inc., San Francisco, CA (US)

( * ) Notice: Subject to any disclaimer, the term of this patent is extended or adjusted under 35 U.S.C. 154(b) by 206 days.

(21) Appl. No.: 15/089,281

(22) Filed: Apr. 1, 2016

(65) Prior Publication Data

US 2017/0289283 A1   Oct. 5, 2017

(51) Int. Cl.

| | | |
|---|---|---|
| *G06F 15/173* | (2006.01) | |
| *H04L 29/08* | (2006.01) | |
| *G06F 8/61* | (2018.01) | |
| *G06F 17/30* | (2006.01) | |
| *H04L 29/06* | (2006.01) | |
| *H04L 12/26* | (2006.01) | |
| *G06F 8/60* | (2018.01) | |
| *G06F 9/445* | (2018.01) | |
| *G06F 15/16* | (2006.01) | |

(52) U.S. Cl.
CPC ............... *H04L 67/22* (2013.01); *G06F 8/60* (2013.01); *G06F 8/61* (2013.01); *G06F 9/445* (2013.01); *G06F 17/30864* (2013.01); *H04L 43/028* (2013.01); *H04L 63/0272* (2013.01)

(58) Field of Classification Search
CPC ... H04L 67/22; H04L 43/028; H04L 63/0272; G06F 8/60; G06F 8/61; G06F 9/445; G06F 17/30864
USPC .......................................................... 709/224
See application file for complete search history.

(56) References Cited

U.S. PATENT DOCUMENTS

| | | | | |
|---|---|---|---|---|
| 9,444,844 | B2 * | 9/2016 | Edery ..................... | G06F 21/51 |
| 9,467,464 | B2 * | 10/2016 | Gula .................. | H04L 63/1433 |
| 9,491,069 | B2 * | 11/2016 | Goldfarb ............. | H04L 63/0263 |
| 9,628,580 | B2 * | 4/2017 | Yishay ................. | H04L 63/1416 |
| 9,686,127 | B2 * | 6/2017 | Ramachandran ....... | H04L 69/40 |
| 9,722,900 | B2 * | 8/2017 | Reynolds ............ | H04L 43/0876 |
| 9,740,703 | B2 * | 8/2017 | Lim .................. | G06F 17/30091 |
| 9,747,439 | B2 * | 8/2017 | Hiscock .................. | G06F 21/55 |

(Continued)

*Primary Examiner* — Melvin H Pollack
(74) *Attorney, Agent, or Firm* — Fenwick & West LLP (57) ABSTRACT

Disclosed is a method for tracking usage of applications on a mobile device that includes a virtual private network (VPN) application. The VPN application includes a rule dictionary to store a rule for each application that is executable on the mobile device. A rule comprises an identifier for the application and an associated regular expression. To create a rule, a new application is installed on the mobile device and executed to create network traffic. The network traffic from the new application is inspected and a regular expression that matches the new application is created and stored in the rules dictionary. Once the rule is stored, a usage of the application can be identified based on monitoring the network traffic and searching the rule dictionary to identify a matching application. Once a matching application is found, the usage metric of the application is updated.

14 Claims, 4 Drawing Sheets

(56) References Cited

U.S. PATENT DOCUMENTS

| | | | | |
|---|---|---|---|---|
| 9,800,608 | B2* | 10/2017 | Korsunsky | G06F 21/55 |
| 9,860,274 | B2* | 1/2018 | Jacobs | H04L 63/20 |
| 9,875,264 | B2* | 1/2018 | Rosewell | G06F 17/30327 |
| 2017/0104775 | A1* | 4/2017 | Vasseur | H04L 63/1425 |
| 2017/0142068 | A1* | 5/2017 | Devarajan | H04L 63/0254 |
| 2017/0163666 | A1* | 6/2017 | Venkatramani | H04L 63/1416 |
| 2017/0364700 | A1* | 12/2017 | Goldfarb | G06F 21/6218 |
| 2017/0374029 | A1* | 12/2017 | Cianfrocca | H04L 63/0227 |
| 2018/0027006 | A1* | 1/2018 | Zimmermann | H04L 63/1425 |

* cited by examiner

AUTOMATED DPI PROCESS

BACKGROUND

This invention relates generally to the field of automatic detection of an executing application, in particular to the detection of application usage on a device via network traffic.

Mobile devices such as mobile phones and tablets typically have many mobile applications installed on them, and these mobile devices often execute more than one of these applications concurrently. Mobile device uses accesses some mobile applications more than the others. The usage data about a mobile application is an effective way of evaluating the value of that mobile application. A mobile application developer can use the usage data for its own applications (and possibly others) to make business decisions about the development or service management of its mobile applications.

SUMMARY

A mobile application provides a virtual private network (VPN) access for a mobile device on which it runs. The VPN provides a secure network to a user, the secure network protects the mobile device from unsafe network environment such as network attach, hackers, etc., The VPN access allows a user to securely access mobile applications included in a private network, for example, email application from an employer, documents residing on an employer server, and other such applications. Additionally, the VPN access enables access to other mobile applications that are not a part of the private network and allows the other mobile applications to send and receive data across shared or public networks, such as the Internet. The data or requests from the other mobile applications are sent via a VPN tunnel created by the VPN application.

The VPN application pushes the data or requests to/from the device to a server that includes a deep packet inspection (DPI) module. The DPI module monitors the stored data traffic sent through the VPN's network. Additionally, the server includes a rules dictionary, which may be stored in a database. The rules dictionary stores one or more regular expressions for each of a plurality of mobile applications. When the DPI module inspects the stored network traffic, it searches the rules dictionary to find a match for a regular expression that matches the incoming data traffic. If a matching regular expression is found, the application name that maps to the matched regular expression is retrieved from the rules dictionary. The application's usage data is then considered to be known and tracked. For example, a usage count for the retrieved application is incremented and stored in a database.

In another embodiment, when a new application is released to a mobile application store, the DPI module initiates an automated process to determine a rule for the new application. The DPI module downloads and launches the new application. Once the application launches, the DPI module simultaneously monitors the data on the network interface. Based on the monitored data, the DPI module determines a regular expression that represents the mobile application. The regular expression is mapped to a mobile application identifier for the new application, and the mapping is stored in a rules dictionary.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Figure 1:
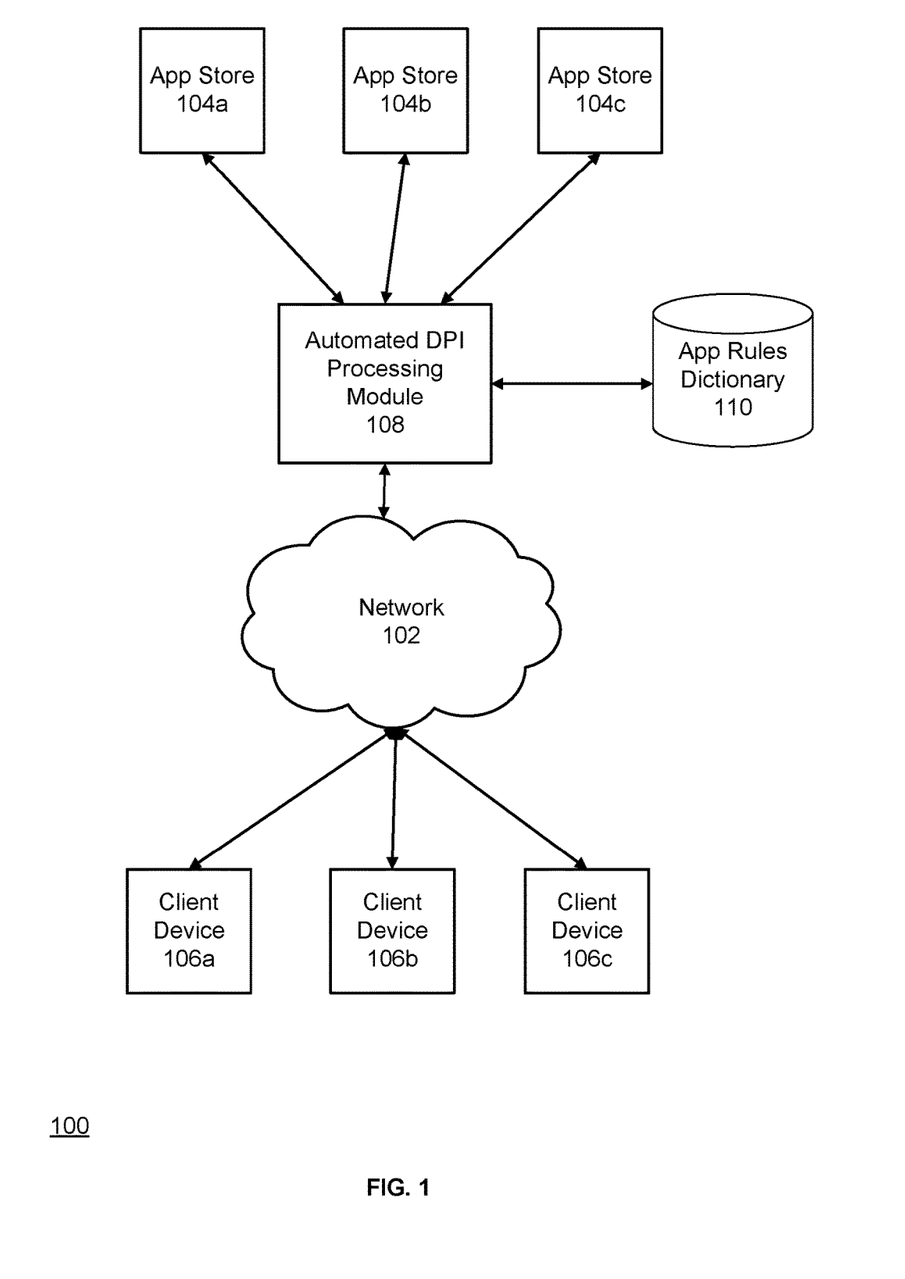
FIG. 1 is a block diagram illustrating a computing environment for an automated DPI process for mobile applications according to one embodiment of the present disclosure.

FIG. 1 is a block diagram illustrating a computing environment for an automated DPI process for mobile applications according to one embodiment of the present disclosure. The computing environment 100 shown by FIG. 1 comprises one or more client devices 106, a network 102, one or more mobile application stores 104, an application rules dictionary 110 and an automated deep packed inspection (DPI) processing module for mobile applications 108. In alternative configurations, different and/or additional components may be included in the system environment 100.

The client devices 106 are one or more computing devices capable of receiving user input as well as transmitting and/or receiving data via the network 102. In one embodiment, a client device 106 is a smartphone, a tablet or a conventional computer system, such as a desktop or laptop computer. Alternatively, a client device 106 may be a device having computer functionality that accesses a set of mobile applications. A client device 106 is configured to communicate via the network 102. In one embodiment, a client device 106 executes an application allowing a user of the client device 106 to interact with the keyword reporting system for mobile applications 108. For example, a client device 106 executes a browser application to enable interaction between the client device 106 and the keyword reporting system 108 via the network 102. In another embodiment, a client device 106 interacts with the keyword reporting system 108 through an application programming interface (API) running on a native operating system of the client device 106, such as IOS® or ANDROID™.

The client devices 106 are configured to communicate via the network 102, which may comprise any combination of local area and/or wide area networks, using both wired and/or wireless communication systems. In one embodiment, the network 102 uses standard communications technologies and/or protocols. For example, the network 102 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 102 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In another embodiment, the network 102 includes a VPN tunnel coupled to the VPN application on the client device 106. The VPN application monitors the network traffic via the network 102 and pushes the network traffic information to a DPI processing module 108. In some embodiments, all or some of the communication links of the network 102 may be encrypted using any suitable technique or techniques.

One or more mobile application stores 104 may be coupled to the automated DPI processing module 108 that processes data sent over the network interface by an application executing on the client device 106 to determine mobile application usage on that client device 106. A mobile application store 104 includes downloadable mobile applications and catalogs for the mobile applications. Exemplary mobile application stores include the Apple iOS Store, Google Play store, Amazon application store, Mac application store, Windows application store and other such stores.

The automated DPI processing module 108 for mobile applications determines application usage for a mobile application on a client device 106. Additionally, the automated DPI processing module 108 automatically determines a rule for detecting usage of a mobile application via a VPN application. The automated DPI processing module 108 monitors the network traffic sent by mobile applications via the VPN application. For each data request sent over the network, the automated DPI processing module 108 searches for a regular expression from a rules dictionary that matches the data request. If a match is found, the automated DPI processing module 108 retrieves a mapping of the regular expression to a mobile application from the rules dictionary. The DPI processing module 108 increments a usage metric of the mobile application.

In some embodiments, the rule making is enabled on detection of a new application available on one of the application stores 104. To make a rule, the mobile application is downloaded on a test device 106, and the application is launched. While the application is running on the test device 106, the data requests sent from the mobile application are monitored. An algorithm that creates a regular expression that matches the format of the data requests is applied to the monitored data requests. The regular expression is then mapped to an application identifier that is associated with the mobile application name, and then new regular expression and identifier are stored as a rule in the rules dictionary.

Figure 2:
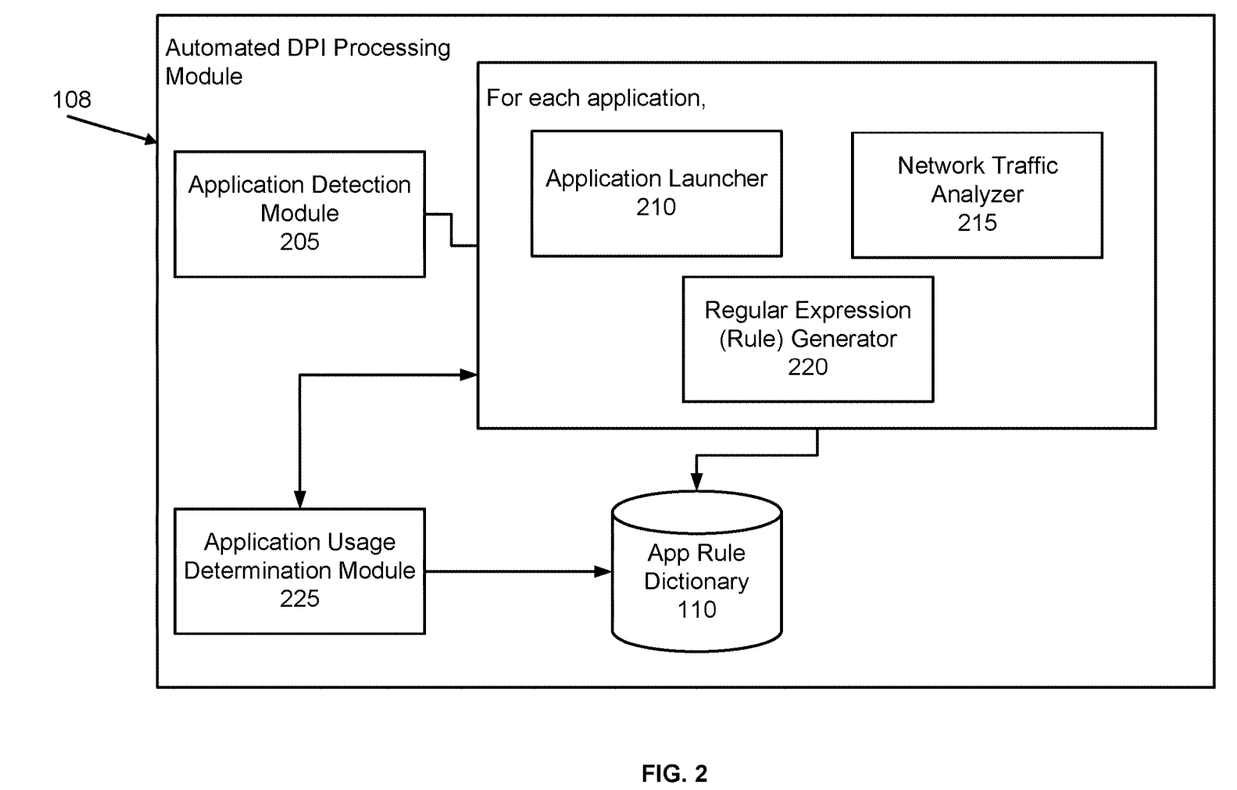
FIG. 2 is a block diagram illustrating logical components of an automated DPI processing module according to one embodiment of the present disclosure.

FIG. 2 is a block diagram illustrating logical components of an automated DPI processing module 108, according to one embodiment of the present disclosure. The automated DPI processing module 108 includes an application detection module 205, an application launcher 210, a network traffic analyzer 215, a rule generator 220 and an application usage determination module 225 that can store and retrieve data from an application rules dictionary 110.

The application detection module 205 monitors one or more application stores 104 to look for new mobile applications. The mobile applications of interest are added to a queue of applications that are in line for enabling rule making. In one embodiment, the application detection module 205 polls one or more application stores 104 every few minutes to look for new releases of applications. In some embodiments, when polling for new applications, the time of the last poll is compared to a release time of mobile applications at the application store, thus ensuring that the most recently released mobile applications are detected. In some embodiments, an additional filter may be added to poll for mobile applications in a specific category, for example, sports, news, entertainment, etc. In this embodiment, each category may be polled at a different time interval, thus prioritizing a category that may be more relevant than others.

For each detected application, an application launcher 210 downloads the mobile application from the application store 104 on a test device 106. The application launcher 210 launches the mobile application on the test device 106, for example, by clicking and opening the application. Once application is launched, the application sends data requests via a VPN network interface. The test device executes only a VPN application along with the detected and downloaded mobile application to ensure that the data requests sent on the VPN network interface are generated from the launched mobile application.

Once the application is launched and data requests are generated, a network traffic analyzer 215 monitors the data request over the VPN network interface. In one embodiment, if the mobile application is executing on a test device 106, the monitored data request is forwarded to the rule generator 220 to generate a regular expression based on the monitored data request. In another embodiment, if the mobile application is executing on a client device 106, the monitored data is compared to each regular expression retrieved from an application rules dictionary 110 to determine if the monitored traffic is from a known mobile application. If no match is found, the monitored data is forwarded to the rule generator 220.

A regular expression (rule) generator 220 creates a regular expression that can identify a mobile application running on a client device 106. A regular expression is a sequence of characters that define a search pattern wherein the pattern includes strings of alphabet, characters, symbols and numerical elements. The regular expression generator 220 receives the monitored data from a network traffic analyzer 215 and applies an algorithm to create a regular expression from the monitored data. The created regular expression is mapped to a mobile application identifier such as a mobile application title or any other unique characteristic associated with the mobile application. The mapping is stored as a rule in the application rules dictionary 110 for future use.

An application rules dictionary includes a list of rules for detecting an executing mobile application on a client device 104. Each rule includes a regular expression that can be mapped to a mobile application. The regular expression represents a search pattern that corresponds to the data requests sent over a network by the mobile application.

A mobile application is associated with a number of analytical metrics. One of the metrics is an application usage metric. The application usage metric may include the amount of time the application executes on the mobile device, the frequency at which an application is accessed by a user, application session interval and other such metrics. The application usage determination module 225 tracks a usage count for each type of an application usage.

The application usage determination module 225 receives monitored network traffic of a client device 106 from the network traffic analyzer 215. For each monitored data request, the application usage determination module 225 searches for a regular expression in the application rules dictionary 110 that matches the monitored data request. If a match is found, the application name associated with the regular expression is retrieved and an application usage count for the application is updated, for example, a usage count may be incremented or a frequency interval of application usage may be updated. In another embodiment, if the application was accessed within a certain period of time, a session interval metric for the application usage count is incremented.

Figure 3:
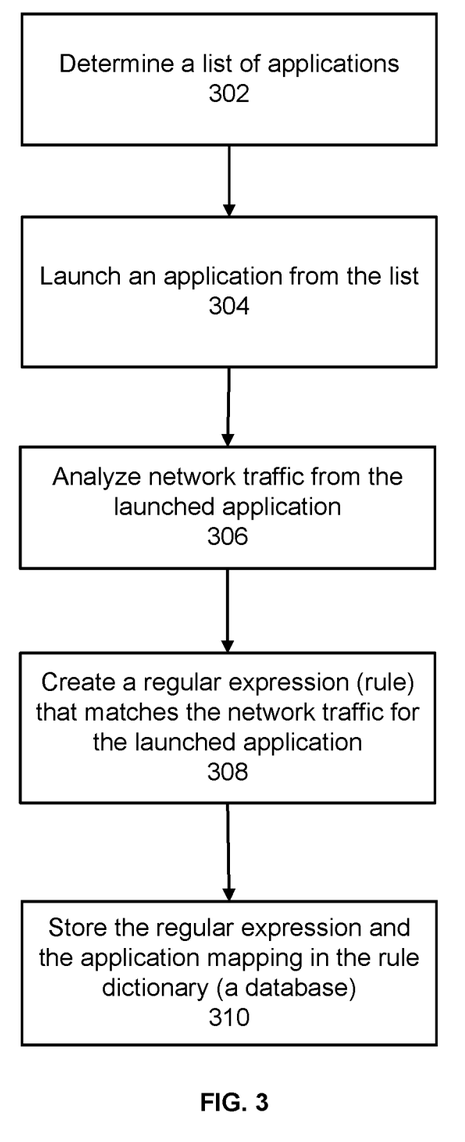
FIG. 3 is a flow diagram illustrating a method for generating and storing a rule to the rules dictionary according to one embodiment of the present disclosure.

FIG. 3 is a flow diagram illustrating a method for generating and storing a rule to the rules dictionary according to one embodiment of the present disclosure. The automated DPI processing module 108 enables an automated process to generate a rule for each new application that is released to an application store. A list of applications for rule making is determined 302. For each application in the list, the application is launched 304 on a test device 104. To reduce interference of traffic from other mobile applications, the only applications that are executed on the test device 104 are the VPN application and the application from the list for which rule making is under progress. The network traffic is analyzed 306 from the launched application to create 308 a regular expression that matches the pattern of the analyzed network traffic. For example, a mobile application (ABC) may own IP addresses from 192.168.1.10 to 192.168.1.19. The corresponding regular expression created to match any address for the mobile application may be indicated by "192\.168\.1\.1(d)\". The regular expression is mapped to the mobile application identifier (e.g. a mobile application title, a mobile application author, etc.) and stored 310 in the application rules dictionary. Continuing the example, the rules dictionary 110 stores the mapping "192\.168\.1\.1(d)\"→ABC.com. Once the rules are stored, the application rules dictionary can be accessed by a VPN application on a client device 106 to determine mobile application's usage.

Figure 4:
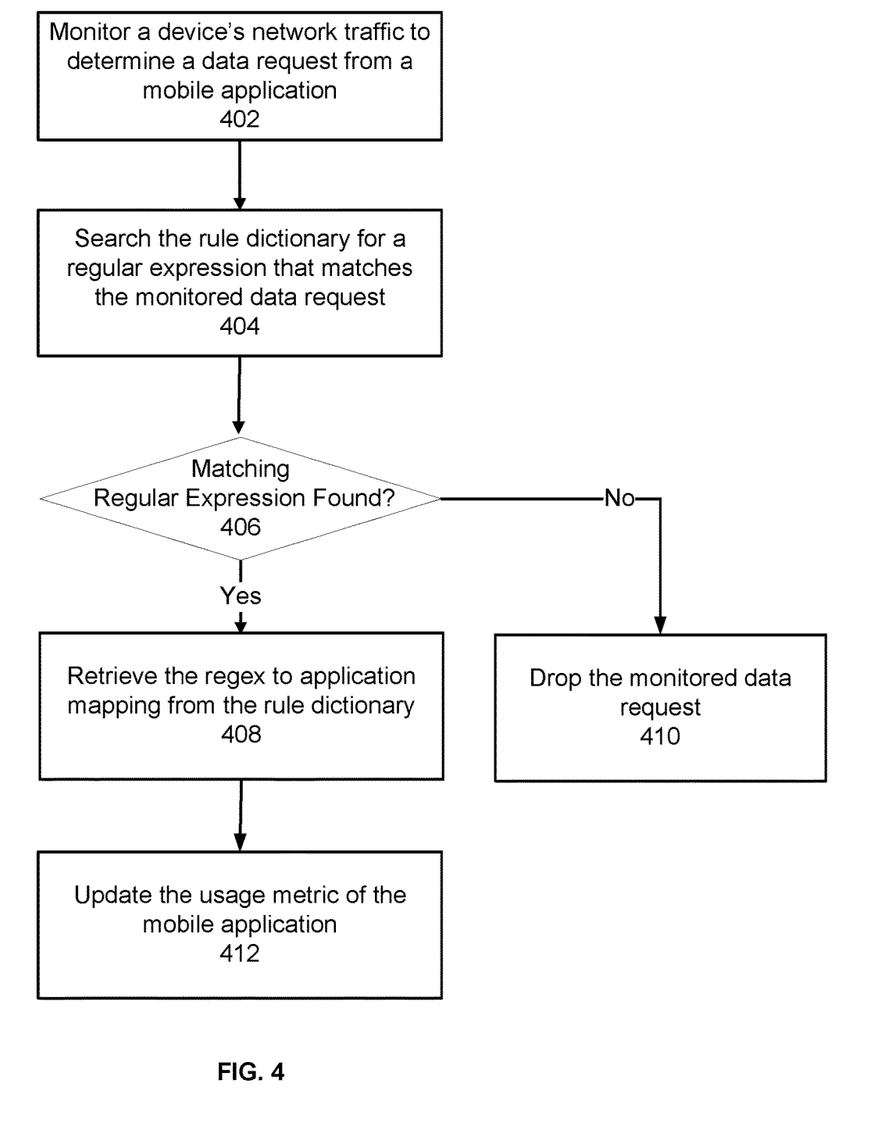
FIG. 4 is a flow diagram illustrating a method for determining an application usage according to one embodiment of the present disclosure.

FIG. 4 is a flow diagram illustrating a method for determining an application usage according to one embodiment of the present disclosure. The network traffic analyzer 215 monitors 402 data requests sent to and from mobile applications executing on a client device 106, the data sent on a network interface of the VPN application. For each data request sent, the application usage determination module 225 searches 404 the rules dictionary to find a regular expression that matches the data request. If a matching regular expression is found 406, the mapping of the regular expression to a mobile application identifier is retrieved 408. Continuing the example from FIG. 3, if the monitored data request shows "192.168.1.12, on conducting a search in the rules dictionary, the monitored data request matches the rule "192\.168\.1\.1(d)\"→ABC.com, wherein 192\.168\.1\.1(d)\ is the regular expression and ABC.com is the mobile application title. A usage metric associated with the mobile application is updated 412 in case of a match, in the example above, a usage count metric associated with ABC.com is incremented. In case a matching regular expression is not found, the application usage determination module 225 drops 410 the monitored data packet.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for generating rules for a rules dictionary for tracking usage of applications on a mobile device, the method comprising:

storing, in the rules dictionary, a rule for each application of a plurality of applications that are executable on a mobile device, where each rule is used identifying network traffic associated with the associated application, and wherein each rule comprises an identifier for the application and a regular expression that is configured to identify network traffic associated with the application;

installing a new mobile application on the mobile device;

executing the new application on the mobile device to cause the new application to create network traffic;

inspecting the network traffic caused by the new application;

creating a regular expression that matches the network traffic created by the new application; and storing in the rules dictionary a new rule that comprises the regular expression created for the new application and an identifier for the new application.

2. The method of claim 1 further comprises:
monitoring network traffic on the mobile device;
searching the rules dictionary for a rule having a regular expression that matches the monitored network traffic;
identifying a matched application as being the application associated with the identifier of the rule having a regular expression that matches the monitored network traffic; and
updating a usage metric for the matched application.

3. The method of claim 1 further comprises identifying a new application for the mobile device.

4. The method of claim 3 further comprises monitoring a plurality of application stores to identify new applications.

5. The method of claim 1, wherein the regular expression is a sequence of characters that define a search pattern associated with the traffic created by an executing mobile application.

6. The method of claim 1, wherein the network traffic is monitored by a virtual private network application that provides a secure access to a network.

7. The method of claim 1, wherein the rule dictionary is stored in a database.

8. A computer program product for tracking usage of applications on a mobile device, the computer program product comprising a computer-readable storage medium containing computer program code for:
storing, in the rules dictionary, a rule for each application of a plurality of applications that are executable on a mobile device, where each rule is used identifying network traffic associated with the associated application, and wherein each rule comprises an identifier for the application and a regular expression that is configured to identify network traffic associated with the application;
installing a new mobile application on the mobile device;
executing the new application on the mobile device to cause the new application to create network traffic;
inspecting the network traffic caused by the new application;
creating a regular expression that matches the network traffic created by the new application; and
while the shutter button is displayed at the second location, detecting a second touch input to the shutter button; and
storing in the rules dictionary a new rule that comprises the regular expression created for the new application and an identifier for the new application.

9. The computer program product of claim 8, wherein the computer program code further comprises:
monitoring network traffic on the mobile device;
searching the rules dictionary for a rule having a regular expression that matches the monitored network traffic;
identifying a matched application as being the application associated with the identifier of the rule having a regular expression that matches the monitored network traffic; and
updating a usage metric for the matched application.

10. The computer program product of claim 8 wherein the computer program code further comprises identifying a new application for the mobile device.

11. The computer program product of claim 10, wherein identifying a new application further includes monitoring a plurality of application stores to identify new applications.

12. The computer program product of claim 8, wherein the regular expression is a sequence of characters that define a search pattern associated with the traffic created by an executing mobile application.

13. The computer program product of claim 8, wherein the network traffic is monitored by a virtual private network application that provides a secure access to a network.

14. The computer program product of claim 8, wherein the rule dictionary is stored in a database.

* * * * *

UNITED STATES PATENT AND TRADEMARK OFFICE
CERTIFICATE OF CORRECTION

PATENT NO. : 10,158,733 B2
APPLICATION NO. : 15/089281
DATED : December 18, 2018
INVENTOR(S) : Ungerer et al.

It is certified that error appears in the above-identified patent and that said Letters Patent is hereby corrected as shown below:

In the Claims

In Column no: 6, Line(s) no: 55, Claim 1, "used identifying" to read as --used for identifying--

In Column no: 7, Line(s) no: 32, Claim 8, "used identifying" to read as --used for identifying--

In Column no: 8, Line(s) no: 7-9, Claim 8, delete "while the shutter button is displayed at the second location, detecting a second touch input to the shutter button; and"

In Column no: 8, Line(s) no: 23, Claim 10, after "product of claim 8" insert --,--

Signed and Sealed this
Thirteenth Day of August, 2019

Andrei Iancu
*Director of the United States Patent and Trademark Office*